(12) United States Patent
Chou et al.

(10) Patent No.: US 7,016,304 B2
(45) Date of Patent: Mar. 21, 2006

(54) LINK LEVEL RETRY SCHEME

(75) Inventors: Ching-Tsun Chou, Palo Alto, CA (US);
Suresh Chittor, Beaverton, OR (US);
Andalib Khan, Hillsboro, OR (US);
Akhilesh Kumar, Sunnyvale, CA (US);
Phanindra K. Mannava, Folsom, CA (US); Rajee S. Ram, Beaverton, OR (US); Sujoy Sen, Portland, OR (US);
Srinand Venkatesan, Beaverton, OR (US); Kiran Padwekar, San Jose, CA (US)

(73) Assignee: Intel Corporation, Santa Clara, CA (US)

(*) Notice: Subject to any disclaimer, the term of this patent is extended or adjusted under 35 U.S.C. 154(b) by 863 days.

(21) Appl. No.: 09/861,260

(22) Filed: May 18, 2001

(65) Prior Publication Data

US 2002/0172164 A1  Nov. 21, 2002

(51) Int. Cl.
*G01R 31/08* (2006.01)
(52) U.S. Cl. ............... 370/235; 370/236; 370/410; 709/238; 714/748; 714/749
(58) Field of Classification Search ........... 370/235, 370/236, 410; 709/238; 714/748, 749
See application file for complete search history.

(56) References Cited

U.S. PATENT DOCUMENTS

| 5,905,871 | A  | * | 5/1999  | Buskens et al. ............ 709/245 |
| 6,272,550 | B1 | * | 8/2001  | Deng et al. ................ 709/246 |
| 6,392,993 | B1 | * | 5/2002  | Hamilton et al. ........... 370/230 |
| 6,574,770 | B1 | * | 6/2003  | Daudelin .................... 714/776 |
| 6,640,325 | B1 | * | 10/2003 | Fischer ...................... 714/748 |
| 6,697,331 | B1 | * | 2/2004  | Riihinen et al. ............ 370/236 |
| 6,807,437 | B1 | * | 10/2004 | Andrus et al. ........... 455/575.7 |
| 2002/0012337 | A1 | * | 1/2002  | Schmidl et al. ............. 370/349 |
| 2002/0150048 | A1 | * | 10/2002 | Ha et al. ..................... 370/231 |
| 2002/0165973 | A1 | * | 11/2002 | Ben-Yehezkel et al. ..... 709/230 |
| 2003/0012212 | A1 | * | 1/2003  | Earnshaw et al. .......... 370/428 |
| 2003/0035438 | A1 | * | 2/2003  | Larsson ..................... 370/466 |

* cited by examiner

*Primary Examiner*—Chi Pham
*Assistant Examiner*—Rhonda Murphy
(74) *Attorney, Agent, or Firm*—Paul E. Steiner

(57) ABSTRACT

A link layer system is provided. The link layer system a first link layer control module and a retry queue for storing a transmitted data packet. The retry control module is coupled to the first link layer control module, which directs the retry queue to discard the transmitted data packet when an acknowledgment bit is received by the first link layer control module.

17 Claims, 5 Drawing Sheets

LINK LEVEL RETRY SCHEME

BACKGROUND OF THE INVENTION

1. Field of the Invention

The present invention relates generally to providing reliable data transmission in a computer network. More particularly, the present invention relates to providing an error recovery scheme that consumes minimal bandwidth.

2. Description of the Related Art

A computer network includes two or more agents (e.g., computers and other communication devices) that are connected with one another so that one agent is able to communicate data electronically with another agent by sending messages or data packets (or frames). In addition to providing individual physical connections between agents, a computer network establishes a cohesive architecture that allows the agents to transmit data in an organized fashion. Examples of computer networks include local-area networks (LANs) used in a typical office setting and wide-area networks such as the Internet.

Logically, the architecture of a computer network can be divided into three functionality layers: the physical layer, the link layer, and the protocol layer. The physical layer is responsible for electrical transfer of the data packet, the link layer provides (among other things) error-free message delivery and flow control, while the protocol layer carries out high-level functionalities, examples of which include cache coherence, interrupt delivery, and memory access ordering.

One of the key functions of the link layer is to recover from transmission errors. All data transmissions between agents in the network are vulnerable to be corrupted by noise in the communication channels. Because data corruption in a computer network is unavoidable, each agent must be able to detect when data in a packet has been corrupted and have a protocol or scheme for recovering from the error. While some error recovery schemes are able to correct errors by using error correction codes, such schemes generally require more overhead. Therefore, it is standard practice to detect and discard the corrupted data packet and have the source agent retransmit the corrupted data packet.

The link layer transforms a communication channel with transmission errors into one that appears free of transmission errors and delivers packets in the order they are sent. It accomplishes this task by having the sending agent organize the data into packets (typically a few hundred bytes) and transmit the data packets sequentially. With each packet, the receiving agent is able to check for errors (by checking parity, for example) and send an acknowledgment (ACK) back to the sending agent if the packet is received error-free. The ACK verifies to the sending agent that the data packet was successfully transmitted. After a certain amount of time (determined by the channel delay), if the sending agent does not receive an ACK for a particular data packet, it will assume that an error has occurred and retransmit the packet to the receiving agent.

This very basic protocol is known as stop and wait, which, as the name suggests, is highly inefficient. The sending agent may transmit only one data packet at a time to the receiving agent and must wait until it receives an ACK before transmitting the next data packet. If there is an error in either the data packet or the ACK, the original data packet must be re-sent before the next packet can be sent. A much more efficient protocol that is commonly used is known as the sliding window protocol, which pipelines the sending of packets and thus is able to "fill" the communication channel with packets in transit and maximize the transmission throughput.

FIG. 1 illustrates a computer network 10 that sends and receives data as a function of time in accordance with the sliding window protocol. Network 10 includes a sending agent 12 and a receiving agent 14, which are coupled to each other through two uni-directional channels 16 and 18. In this example, channels 16 and 18 have a length and capacity of ten data packets each. Assuming that network 10 has a global clock, a data packet sent by sending agent 12 along channel 16 will be received by receiving agent 14 ten clocks after it was sent. The same is true with an ACK transmitted by receiving agent 14 through channel 18 back to sending agent 12.

In the sliding window protocol, sending agent 12 assigns a data sequence number to each data packet to identify the packet, such as packet 0. When data packet 0 arrives at receiving agent 14 without being corrupted, receiving agent 14 transmits an ACK 0 (where in this case, the 0 is an expected sequence number) to communicate to sending agent 12 that data packet 0 has arrived. This simple scenario assumes that neither the data packet nor the ACK was corrupted.

Because data packets and their corresponding ACKs may be corrupted at any point in channels 16 and 18, sending agent 12 must maintain a retry queue that stores the packets it sent. If sending agent 12 does not receive an ACK for a particular packet within an amount of time that is greater than the round-trip delay, the packet is retrieved from the retry queue and re-transmitted. Clearly, sending agent 12 must have a scheme for determining when a packet in the retry queue is no longer needed, otherwise a retry queue of unbounded capacity would be needed. The scheme that the sliding window protocol uses is simple: when sending agent 12 receives an ACK carrying sequence number k, it knows that receiving agent 14 has received packet k, so sending agent 12 can remove all packets with sequence number no greater than k from its retry queue.

One major problem with the sliding window protocol is the bandwidth overhead incurred by the presence of two sequence numbers in every data packet. Firstly, a data packet must carry its own sequence number. Secondly, it must carry the sequence number of an ACK for the data traffic in the opposite direction. Therefore, in network 10, these two sequence numbers would consume $2 \log_2 N$ bits of the bandwidth in each data packet, where N equals the total number of possible sequence numbers.

If the overhead of sequence numbers could be reduced from each data packet transmitted between agents, it would be possible either to reclaim wasted bandwidth or to reduce the cost of the communication channel by using fewer physical wires. Because data carrying wires are expensive, reducing the number of wires required to carry $2 \log_2 N$ bits is very significant, particularly in long communication channels. Therefore, it is highly desirable to have a link level retry scheme for error recovery that reduces the overhead caused by sequence numbers.

BRIEF DESCRIPTION OF THE DRAWINGS

The present invention will be readily understood by the following detailed description in conjunction with the accompanying drawings. To facilitate this description, like reference numerals designate like structural elements.

DETAILED DESCRIPTION

A method and apparatus for correcting data transmission errors in a computer network is provided. In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

Figure 1:
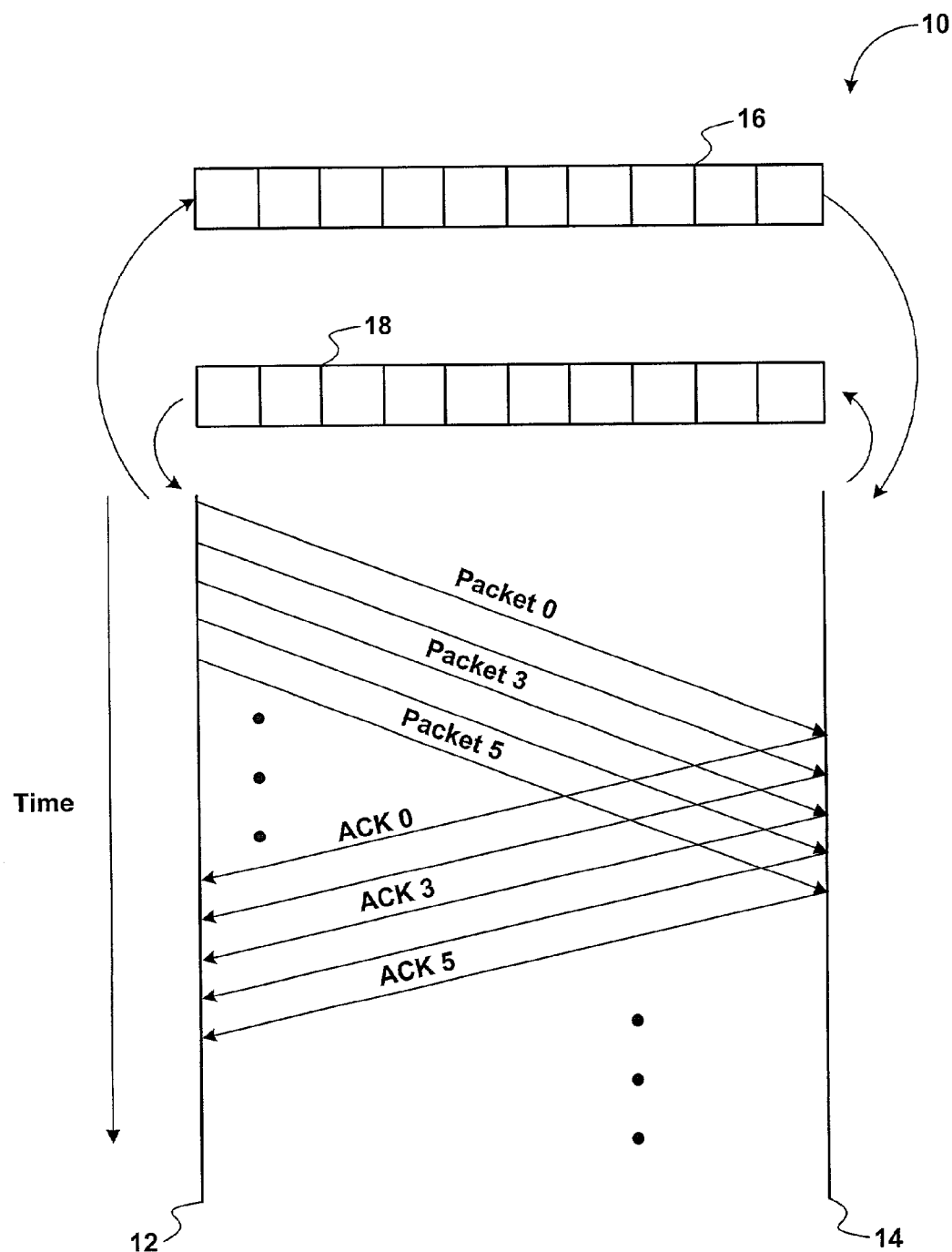
FIG. 1 illustrates a computer network that sends and receives data as a function of time in accordance with the sliding window algorithm.
Figure 2:
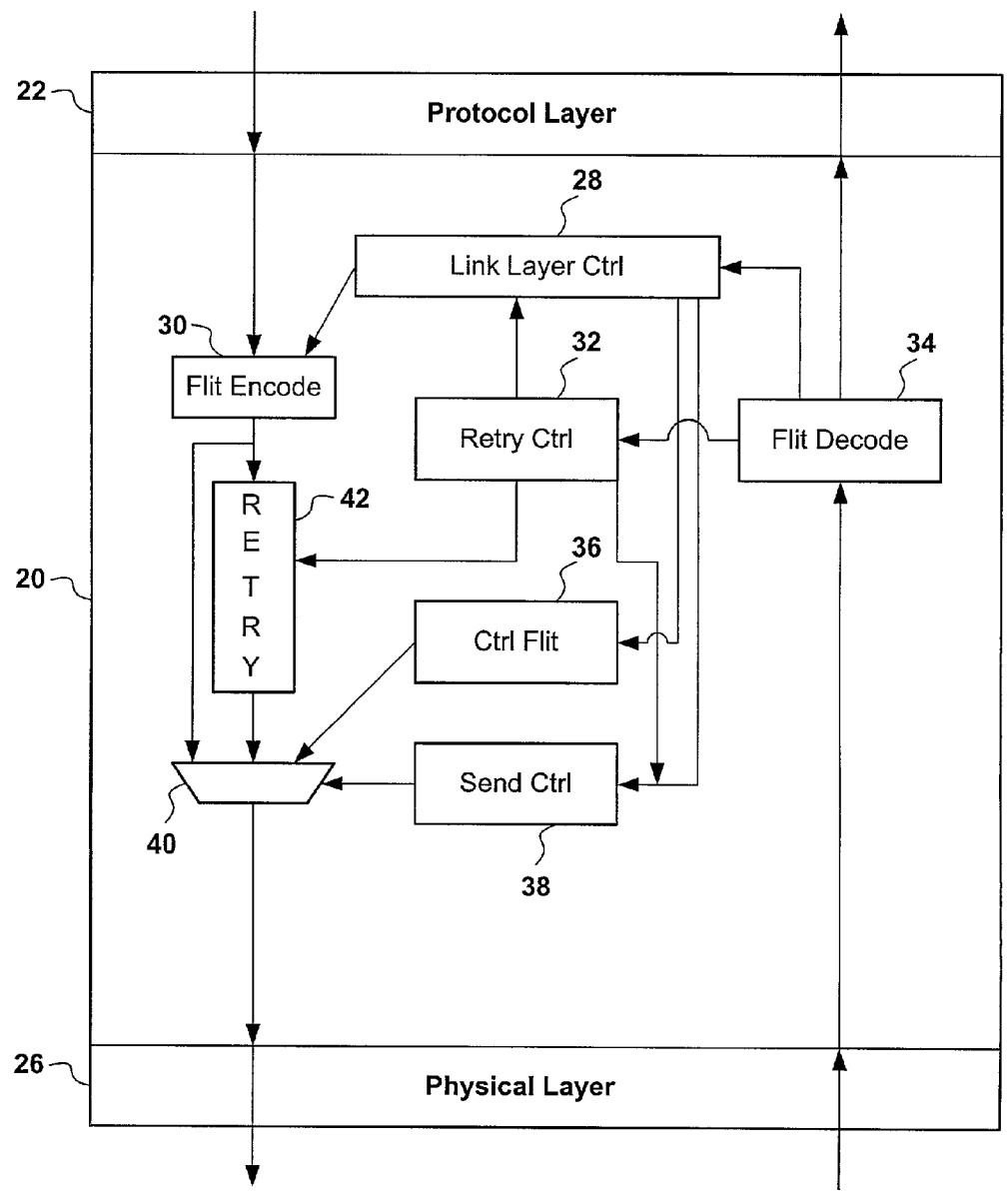
FIG. 2 illustrates a link layer for receiving and transmitting data and providing error recovery in accordance with one embodiment of the present invention.

FIG. 2 illustrates a link layer 20 for receiving and transmitting data and providing error recovery in accordance with one embodiment of the present invention. Outbound data from a protocol layer 22 are organized into information-independent units of flow control (known as info flits) and processed by a link layer 20. The info flits are then processed by physical layer 26, which is responsible for electrical transfer of the data over physical wires. Inbound flits are received by physical layer 26 and processed by each layer in the reverse order of outbound flits. In addition to info flits, there are two other types of flits that do not carry data: control flits and idle flits.

Link layer 20 includes a link layer control module 28, which is coupled to a flit encode module 30, a retry control module 32, a flit decode module 34, a control flit module 36, and a send control module 38. Flit encode module 30 is coupled to a multiplexor 40 (MUX) and a retry queue 42. Retry queue 42 is coupled in turn to retry control module 32, control flit module 36, and MUX 40. MUX 40 is further coupled to retry control module 32 through send control module 38. While link layer 20 also includes many other modules, this diagram has been simplified to focus on components related to error recovery.

Link layer control module 28 is responsible for most of the control functionality in link layer 20, including determining what type of flit to send out and what link layer level control (LLC) information should be sent with the flits. The LLC information is merged with the flit by flit encode module 30, which sends the complete flit out of link layer 20, while also placing a copy of the flit into retry queue 42. If link layer control module 28 determines that a control flit must be sent, it does so through control flit module 36.

Retry control module 32 manages retry queue 42, which is a circular first-in-first-out (FIFO) buffer and provides the status of retry queue 42 to link layer control module 28. A flit is stored (enqueued) by retry queue 42 when it is transmitted to a receiving agent. The flit is discarded (dequeued) when an ACK is received from the receiving agent through flit decode 34, indicating that the flit was received without error. If an error occurs, the receiving agent will send an explicit link level retry request (LLRREQ) to the sending agent, where retry control module 32 will stop enqueueing new flits and command retry queue 42 to rollback to the flit in error and start re-sending from that flit onward. As will be described below, link layer 20 provides for an error recovery scheme without sending a data sequence number or an ACK sequence number with every flit.

Figure 3A:
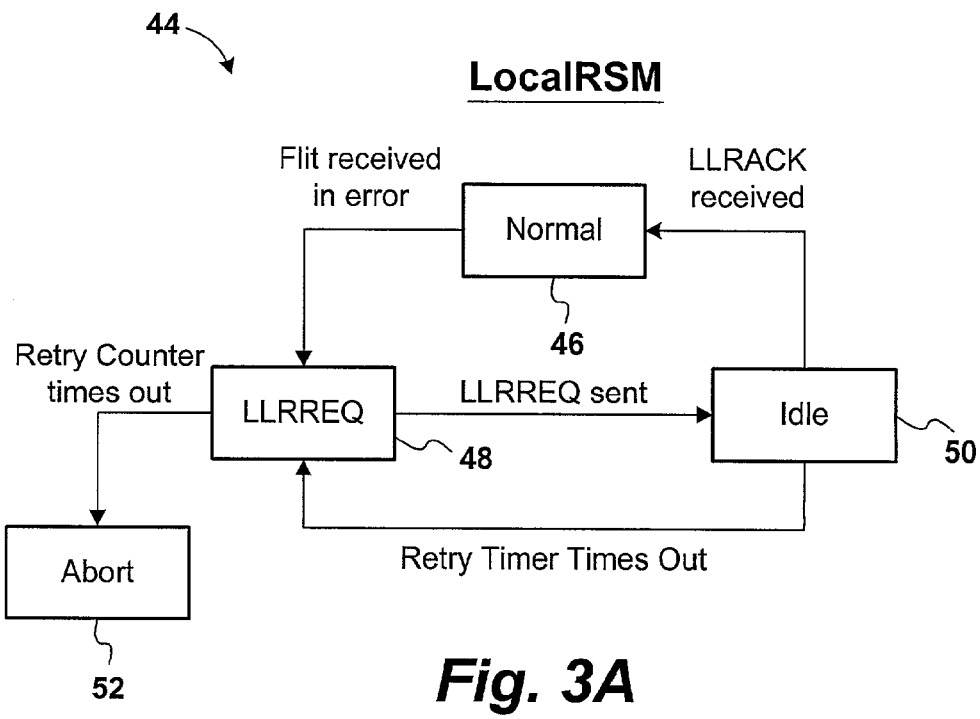
FIG. 3A is the state-transition diagram of a local retry state machine (LocalRSM) residing in link layer control module in accordance with one embodiment of the present invention.
Figure 3B:
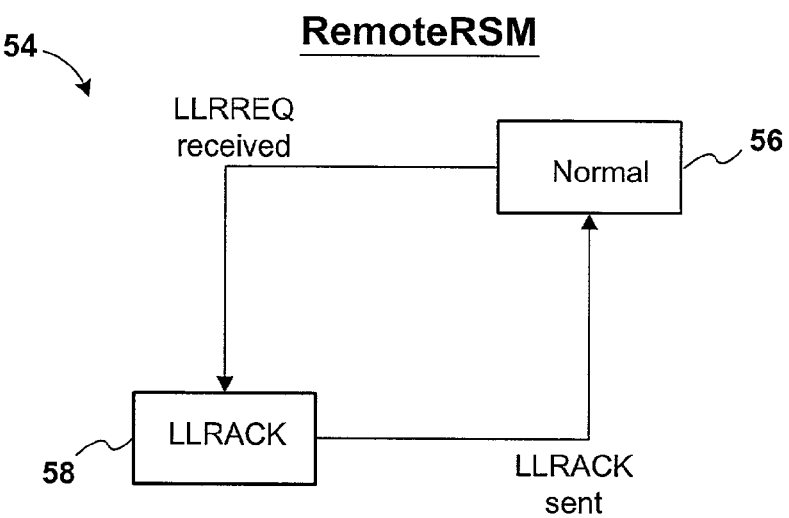
FIG. 3B is the state-transition diagram of a remote retry state machine (RemoteRSM) residing in link layer control module in accordance with one embodiment of the present invention.

FIGS. 3A and 3B are the state-transition diagrams of two state machines, a local retry state machine (LocalRSM) 44 and a remote retry state machine (RemoteRSM) 54, residing in link layer control module 28 in accordance with one embodiment of the present invention. LocalRSM 44 is used by link layer 20 in its role as a receiver of flits and RemoteRSM 54 is used by link layer 20 in its role as a sender of flits. As is well known in the art, because there is flit traffic in both directions, each agent may be both a sender and a receiver of flits and therefore possess both Local RSM 44 and RemoteRSM 54 in its link layer 20. These two state machines are described in more details below.

FIG. 3A shows that LocalRSM 44 starts in a normal state 46 for receiving info flits. As long as no error happens, LocalRSM 44 stays in normal state 46. If a corrupted flit is received, LocalRSM 44 transitions to a retry request state 48, where it transmits a control flit called a link layer retry request (LLRREQ) to RemoteRSM 54 in the other agent and transitions to an idle state 50. The control flit LLRREQ is the only flit type in this scheme that carries an explicit sequence number, which is the sequence number of the corrupted info flit. But since LLRREQ does not carry data, it can carry the sequence number in the space that is occupied by data in other flit types. Therefore the sequence number in LLRREQ introduces no additional overhead.

In idle state 50, the LocalRSM 44 ignores all incoming flits until it receives a control flit called link layer retry acknowledgement (LLRACK), upon which it reverts back to state 46 and resumes normal operation. However, since the LLRACK control flit can also be corrupted by error, if an LLRACK is not received, the RetryTimer of LocalRSM 44 will time out and LocalRSM 44 will transition from state 50 to state 48, where it will send another LLRREQ control flit and transition back to state 50. The time-out threshold for RetryTimer is adjustable by the user but must be greater than the round-trip delay of the link. If LocalRSM 44 times out too many times (e.g., if the link fails permanently), its RetryCounter will reach a threshold (which is also adjustable by the user) and it will abort itself by transitioning to state 52. If the user does not want to allow the protocol to abort itself, the RetryCounter threshold can be set to infinity.

FIG. 3B shows that RemoteRSM 54 starts in a normal state 56 for sending info flits. As long as LLRREQ is not received from the LocalRSM 44 of the other agent, RemoteRSM 54 stays in normal state 56. When the LLRREQ is received, RemoteRSM 54 transitions to a retry acknowledgement state 58, where it sends an LLRACK control flit back to the LocalRSM 44 of the other agent. At the same time, RemoteRSM 54 rolls back to the info flit pointed to by the sequence number carried by the LLRREQ control flit, transitions back to normal state 56, and resumes normal operation from the rolled-back-to info flit.

Figure 4:
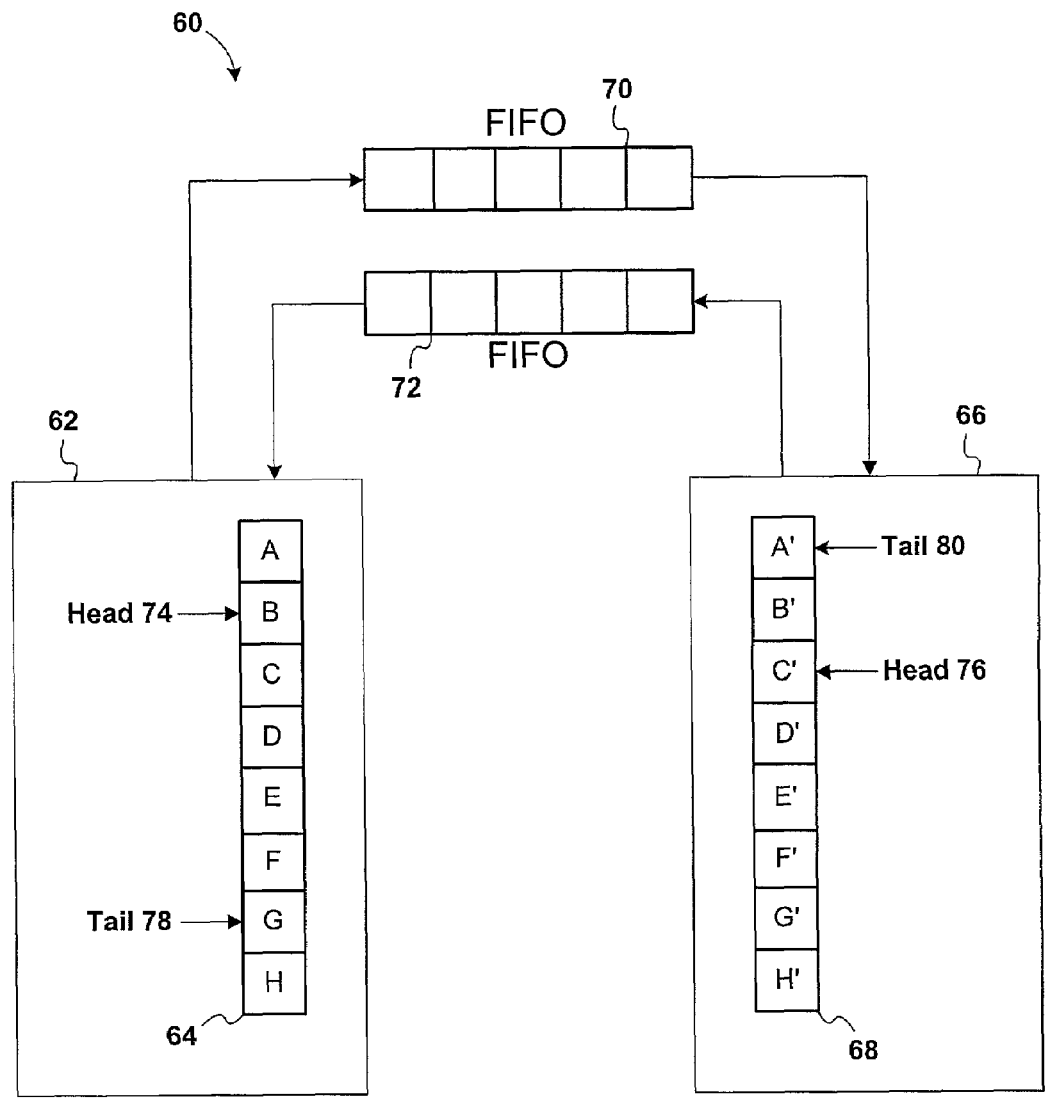
FIG. 4 illustrates a computer network using a link layer retry protocol in accordance with one embodiment of the present invention.

FIG. 4 illustrates a computer network 60 using a link layer retry protocol in accordance with one embodiment of the present invention. Network 60 includes a first agent 62 having a retry queue 64 and a second agent 66 having a retry queue 68. First agent 62 and second agent 66 are coupled to each other by a pair of uni-directional channels 70 and 72, each having a length, capacity, and delay of five data packets. (The uni-directional channels are used for illustrative purposes in FIG. 4. In practice, Intel actually uses a pin-efficient bi-directional channel that behaves like two uni-directional channels simultaneously.) Retry queue 64 stores a copy of flits (A, B, C, etc.) sent by first agent 62 to second agent 66. Retry queue 68 stores a copy of flits (A', B', C', etc.) sent by second agent 66 to first agent 62.

Because both retry queues 64 and 68 are circular in nature, storage space must be reclaimed. Therefore head pointers 74 and 76 and tail pointers 78 and 80 are required to organize the discarding of flits that have been acknowledged. Head pointers 74 and 76 point to the oldest entries in the queues. Accordingly, if an ACK bit is received by first agent 62, head pointer 74 will be incremented and the flit in queue entry B will be discarded from retry queue 64. Tail pointers 78 and 80 point to the entries that are about to be filled. For example, in retry queue 64, queue entry A contained the flit most recently discarded and queue entry G is the entry to be filled by the next new flit to be transmitted. Accordingly, when the next flit is transmitted by retry queue 64, it will be stored in queue entry G as indicated by tail pointer 78, which will then be incremented. It is imperative that the head pointer and tail pointer of a retry queue never coincide with each other except when the retry queue is empty. This constraint forces at least one entry to be unoccupied in the retry queue.

Using the head and tail pointers, both first and second agents 62 and 66 are able to act as both sending and receiving agents while maintaining the corresponding retry queues 64 and 68. If, as in the paragraph above, first agent 62 is the sender and second agent 66 is the receiver, then the next new flit sent by first agent 62 is stored in queue entry G as indicated by tail pointer 78. When second agent 66 receives that flit, an ACK bit (not to be confused with LLRACK control flit) will be piggybacked on an info flit that agent 66 sends to agent 62. When agent 62 receives that ACK bit, it can discard the oldest entry in retry queue 64 (which may or may not be queue entry G), thus freeing up one entry of retry queue 64. Since the info flits that second agent 66 sends to first agent 62 are stored in retry queue 68, the ACK bits piggybacked on them are also stored in retry queue 68 and thus "protected" by the retry scheme. The retry scheme therefore ensures that ACK bits will not be permanently lost even if the flits on which they piggyback are corrupted by errors.

If an error is received by second agent 66, it will send a LLRREQ (instead of an ACK bit) back to first agent 62 and go to idle, refusing to accept any more flits from first agent 62 until it receives an LLRACK. Upon receiving the LLRREQ, first agent 62 will send an LLRACK and stop the sending of new flits from protocol layer 22 via flit encode module 30. Instead, first agent 62 will start to re-transmit info flits from its retry queue 64 starting at the flit pointed to by the sequence number carried by the LLRREQ. When all flits younger than (and including) that flit in the retry queue have been retried, first agent 62 will resume the sending of new flits. When second agent 66 receives LLRACK, it will resume normal operation by again accepting info flits from first agent 62.

Accordingly, unlike the sliding window protocol, the retry scheme of the present invention has the advantage of not requiring an ACK sequence number (which consumes $\log_2 N$ bits of bandwidth) attached to each info flit. Instead, only a single ACK bit is piggybacked on each info flit. Furthermore, this retry scheme does not need even the data sequence numbers, since a receiving agent can compute those numbers by counting the info flits it has received without error. Therefore, the retry scheme of the present invention is able to dramatically reduce the amount of overhead used in correcting corrupted data packets.

Using a formal verification technique for exhaustively exploring all possible states (e.g. a system with a link delay of 8 has in excess of $10^{18}$ states) for the retry scheme of the present invention, certain boundary conditions were discovered. A retry buffer should preferably not be filled to avoid the ambiguous scenario where the head and tail pointers coincide and where the agent cannot decide whether the retry buffer is full or empty. Furthermore, because the retry buffer should not be full, in order to prevent deadlock, the next to the last entry of a retry buffer is preferably not used. The next to the last entry is preferably only used if an ACK can be piggybacked on the flit to be stored into the entry, thereby providing at least one ACK for the other agent to deallocate its retry buffer. Finally, the retry buffer is preferably at least three entries in size.

The retry scheme of the present invention can be further generalized as follows. Each ACK bit can be interpreted as representing K acknowledgements, where K>1. The receiving agent may piggyback an ACK bit only when it has accumulated at least K acknowledgements and, by piggybacking an ACK bit, it decrements its acknowledgement counter by K. When the sending agent receives an ACK bit, it deallocates K entries from its retry buffer at one time. The advantage of this generalized scheme is that the sending agent can free up entries from its retry buffer faster. The disadvantage of this generalized scheme is that, to prevent deadlock, the retry buffer must have at least K+2 entries in size. With this generalization, the user of the retry scheme of the present invention is afforded with the flexibility of choosing a K that is most appropriate for his or her purpose.

To summarize, the retry scheme of the present invention incurs only 1 bit of overhead (i.e., the ACK bit) per info flit, while the sliding window protocol incurs $2 \log_2 N$ bits of overhead (i.e., the data and ACK sequence numbers) per info flit. Therefore, the present invention provides a link level retry scheme that does not require the inclusion of sequence numbers on every data packet and every ACK. Data sequence numbers are easily computed because all data packets will arrive at the remote agent in order. Old entries in the retry queue is deallocated by counting the single ACK bits that are piggybacked on info flits received by the local agent. The present invention therefore provides a significant reduction in the number of bits transmitted, thus lowering the bandwidth required by $2 \log_2 N$ bits (minus the 1 bit of ACK overhead), where N represents the size of the retry queue.

Figure 5:
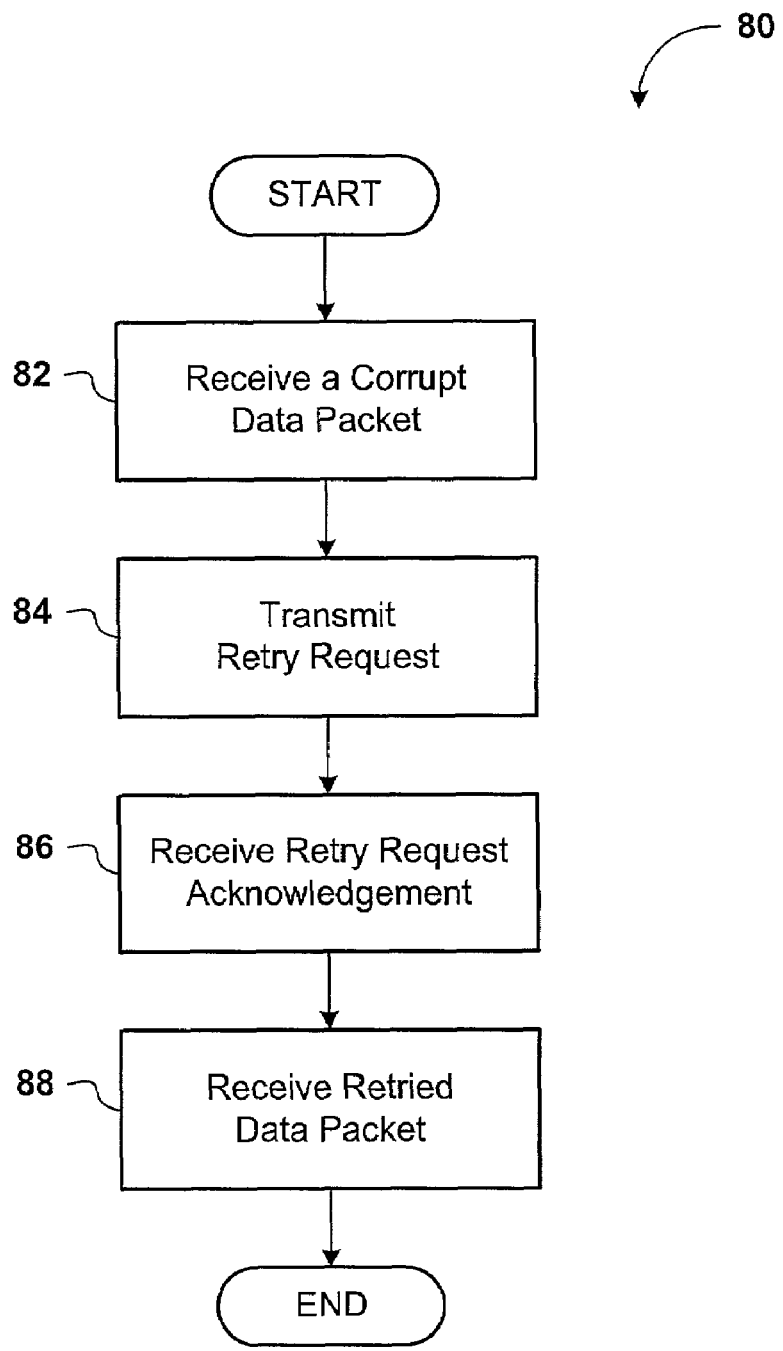
FIG. 5 is a flow chart of a method for link level retry in accordance with one embodiment of the present invention.

FIG. 5 is a flow chart of a method 80 for link level retry in accordance with one embodiment of the present invention. Method 80 begins at a block 82 where a corrupt data packet or flit is received from a remote agent. The local agent then interrupts its normal operation by transmitting a retry request to the remote agent in a block 84. The retry request includes the sequence number of the corrupted flit. In a block 86, the local agent receives a retry acknowledgment from the remote agent. In the time between sending the retry request and receiving the retry acknowledgment, the local agent ignores all info flits from the remote agent until it receives a retry acknowledgment from the remote agent. A timeout counter is used to send out a new retry request to prevent the local agent from idling forever when the retry request or its corresponding retry acknowledgement is corrupted by error. The retry acknowledgment indicates that the remote agent has received the retry request and that a replacement for the corrupted flit was sent. Then the local agent resumes normal operation by receiving the retried replacement flit in a block 88.

Other embodiments of the invention will be apparent to those skilled in the art from consideration of the specification and practice of the invention. Furthermore, certain terminology has been used for the purposes of descriptive clarity, and not to limit the present invention. The embodiments and preferred features described above should be considered exemplary, with the invention being defined by the appended claims.

What is claimed is:

1. A link layer system, comprising:
a first link layer control module;
a retry queue for storing a transmitted data packet;
a retry control module coupled to said first link layer control module and said retry queue, wherein said retry control module directs said retry queue to discard said transmitted data packet when an acknowledgment bit is received by said first link layer control module;
a second link layer control module for receiving the transmitted data packet and transmitting the acknowledgment bit to the first link layer control module if an error is not detected in the transmitted data packet; and
a first control flit module coupled to the first link layer control module and a second control flit module coupled to the second link layer control module,
wherein the second control flit module sends a retry request to the first link layer control module if an error is detected in the transmitted data packet,
wherein the first link layer control module receives the retry request and directs the retry control module to send the transmitted data packet from the retry queue,
wherein the first control flit module sends a retry acknowledgment to the second link layer control module after receiving the retry request, receiving a retry acknowledgment before one of a retry timer or a retry counter times out.

2. A link layer system as recited by claim 1, wherein the retry queue includes a head pointer indicating a location of the transmitted data packet, wherein the transmitted data packet is the oldest transmitted data packet in the retry queue.

3. A link layer system as recited by claim 2, wherein the retry queue the head pointer is incremented and the transmitted data packet is dequened from the retry queue when the acknowledgment bit for the transmitted data packet is received.

4. A link layer system as recited by claim 1, wherein the retry queue includes a tail pointer indicating a location of an unoccupied entry to store a next transmitted data packet.

5. A link layer system as recited by claim 4, wherein said tail pointer is incremented each time a new data packet is stored into the retry queue.

6. A method for recovering from transmission errors in data communication channels, comprising:
receiving a corrupted data packet from a remote agent;
transmitting a retry request to said remote agent in response to said error, wherein said remote agent transmits a retry acknowledgment upon receiving said retry request;
receiving a retry acknowledgment before one of a retry timer or a retry counter times out; and
receiving a retried data packet.

7. A method for recovering from transmission errors in data communication channels as recited in claim 6, wherein said retry request includes a sequence number of the corrupted data packet.

8. A method for recovering from transmission errors in data communication channels as recited in claim 7, wherein the timeout of the retry timer exceeds a round trip delay between a source agent and the remote agent.

9. A method for recovering from transmission errors in data communication channels as recited in claim 8, further comprising transitioning to an abort state if the retry counter times out.

10. A method for recovering from transmission errors in data communication channels as recited in claim 9, further comprising sending an acknowledgment bit if any data packet is received without error.

11. A method for recovering from transmission errors in data communication channels as recited in claim 6, further comprising sending the retried data packet from the remote agent after the remote agent sends a retry acknowledgment.

12. A set of instructions residing in a storage medium, said set of instructions capable of being executed by a processor for recovering from transmission errors in data communication channels, comprising:
receiving a corrupted data packet from a remote agent;
transmitting a retry request to said remote agent in response to said error, wherein said remote agent transmits a retry acknowledgment upon receiving said retry request;
receiving a retry acknowledgment before one of a retry timer or a retry counter times out; and
receiving a retried data packet.

13. A set of instructions for recovering from transmission errors in data communication channels as recited in claim 12, wherein said retry request includes a sequence number of the corrupted data packet.

14. A set of instructions for recovering from transmission errors in data communication channels as recited in claim 13, wherein the timeout of the retry timer exceeds a round trip delay between a source agent and the remote agent.

15. A set of instructions for recovering from transmission errors in data communication channels as recited in claim 14, further comprising transitioning to an abort state if the retry counter times out.

16. A set of instructions for recovering from transmission errors in data communication channels as recited in claim 15, further comprising sending an acknowledgment bit if any data packet is received without error.

17. A set of instructions for recovering from transmission errors in data communication channels as recited in claim 12, further comprising sending the retried data packet from the remote agent after the remote agent sends a retry acknowledgment.

* * * * *